(12) United States Patent
Fiedler et al.

(10) Patent No.: US 9,577,470 B2
(45) Date of Patent: Feb. 21, 2017

(54) ELECTRICAL AND/OR ELECTRONIC SUPPLY CIRCUIT AND METHOD FOR PROVIDING A SUPPLY VOLTAGE

(75) Inventors: Marc Fiedler, Reinach (CH); Reinhard Griech, Weil am Rhein (DE)

(73) Assignee: Endress + Hauser Process Solutions AG, Kagenstr, Reinach (CH)

( * ) Notice: Subject to any disclaimer, the term of this patent is extended or adjusted under 35 U.S.C. 154(b) by 822 days.

(21) Appl. No.: 13/482,340

(22) Filed: May 29, 2012

(65) Prior Publication Data

US 2012/0306276 A1    Dec. 6, 2012

(30) Foreign Application Priority Data

May 30, 2011  (DE) ................ 10 2011 076 706

(51) Int. Cl.
| | |
|---|---|
| *H02J 1/00* | (2006.01) |
| *H02J 3/00* | (2006.01) |
| *H02J 9/04* | (2006.01) |
| *G06F 1/26* | (2006.01) |
| *G06F 1/30* | (2006.01) |
| *H02J 9/06* | (2006.01) |
| *H04B 1/16* | (2006.01) |
| *H02J 13/00* | (2006.01) |

(52) U.S. Cl.
CPC ............... *H02J 9/04* (2013.01); *G06F 1/263* (2013.01); *G06F 1/305* (2013.01); *H02J 9/061* (2013.01); *H02J 13/0044* (2013.01); *H04B 1/1607* (2013.01); *H02J 2001/008* (2013.01); *Y02B 70/3291* (2013.01); *Y02B 90/222* (2013.01); *Y04S 20/12* (2013.01); *Y04S 20/248* (2013.01); *Y10T 307/696* (2015.04)

(58) Field of Classification Search
CPC ........ H02J 2007/0095; H02J 7/02; H02J 9/00; H02J 9/04; H02J 7/00
USPC ..................................................... 307/80, 64
See application file for complete search history.

(56) References Cited

U.S. PATENT DOCUMENTS

| | | |
|---|---|---|
| 5,387,858 A | 2/1995 | Bender |
| 7,330,695 B2 | 2/2008 | Karschnia |
| 7,443,199 B2 | 10/2008 | da Fonte Dias |
| 7,932,631 B2 | 4/2011 | Chen |
| 8,145,180 B2 | 3/2012 | Brown |
| 2003/0193363 A1 | 10/2003 | Egan |

(Continued)

FOREIGN PATENT DOCUMENTS

| | | |
|---|---|---|
| CN | 101036304 A | 9/2007 |
| CN | 101273313 A | 9/2008 |

(Continued)

OTHER PUBLICATIONS

German Search Report.
European Search Report, EPO, Munich, Jun. 27, 2014.

*Primary Examiner* — Carlos Amaya
(74) *Attorney, Agent, or Firm* — Bacon & Thomas, PLLC

(57) ABSTRACT

An electrical and/or electronic supply circuit, which serves to provide a first or a second, essentially constant value of a supply voltage, which supply voltage serves to operate an operating electronics. The supply circuit serves to output the first value of the supply voltage when the supply voltage is derived from a first voltage source, and the supply circuit serves to output the second value of the supply voltage when the supply voltage is derived from a second voltage source.

11 Claims, 1 Drawing Sheet

(56) References Cited

U.S. PATENT DOCUMENTS

| | | | |
|---|---|---|---|
| 2009/0094466 A1* | 4/2009 | Matthew et al. | 713/300 |
| 2010/0109433 A1 | 5/2010 | Chen | |
| 2010/0306567 A1 | 12/2010 | Seiler | |
| 2011/0133655 A1* | 6/2011 | Recker et al. | 315/159 |
| 2012/0091809 A1 | 4/2012 | Muller | |

FOREIGN PATENT DOCUMENTS

| | | |
|---|---|---|
| DE | 60022764 T2 | 7/2006 |
| DE | 102005058432 A1 | 6/2007 |
| DE | 102007027902 A1 | 12/2008 |
| DE | 102007045884 A1 | 4/2009 |
| DE | 102008054088 | 5/2010 |
| DE | 102008054088 A1 | 5/2010 |
| DE | 102008060764 A1 | 6/2010 |
| DE | 20 2010017471 U1 | 2/2012 |
| DE | 102010032831 | 2/2012 |
| DE | 202010017471 U1 | 2/2012 |
| EP | 1 202139 A1 | 5/2002 |
| EP | 2413532 A1 | 2/2012 |
| WO | WO 2009/040191 A1 | 4/2009 |

\* cited by examiner

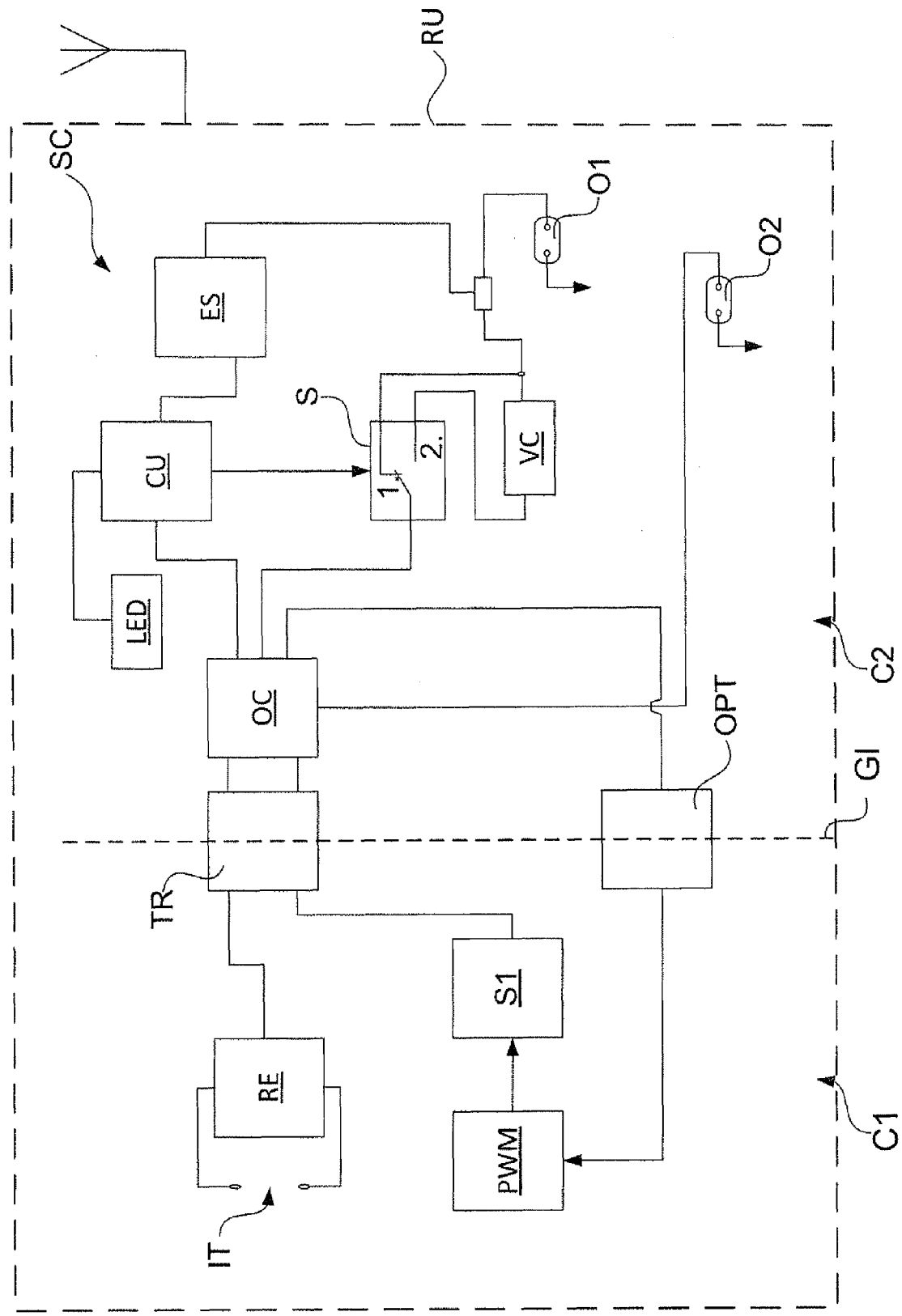

ELECTRICAL AND/OR ELECTRONIC SUPPLY CIRCUIT AND METHOD FOR PROVIDING A SUPPLY VOLTAGE

TECHNICAL FIELD

The invention relates to an electrical and/or electronic supply circuit and a method for providing a supply voltage, and to a radio unit for a plant of process automation technology having such a supply circuit.

BACKGROUND DISCUSSION

It is known from the state of the art, for example from WO 2003/023536 A1, WO 2009/060000 A1, WO 2009/063053 A1 and EP 0940738 A2, to use radio units in plants of process automation technology for easier servicing of the field devices. There are solutions where the field devices have integrated radio units from the start. However, also known is the retrofitting of field devices with radio units, in order that the field devices can subsequently be operated wirelessly.

The energy supply of the field devices as well as the radio units occurs, in such case, for example, via a current loop, to which one or a number of field devices and/or one or a number of radio units are connected. As regards hardware, these electrical current loops are, in such case, a two conductor or a multiple conductor arrangement. The supply of the electrical current loop with electrical energy occurs, in such case, for example, via a supply device, such as, for example, a power supply, which delivers the electrical voltage required for setting an electrical current value in the current loop. If the electrical energy present in the current loop does not suffice to supply all field devices connected to the current loop, it is also possible to provide a separate voltage supply via an additional supply device for individual field devices or a radio unit. For this purpose, it is known, for example, from the state of the art, for example, DE 102004020393 A1, to integrate a battery into the radio unit so that the radio unit and a field device connected thereto do not, in given cases, need to be supplied with electrical energy from the current loop.

In industrial plants, a number of supply devices are often required due to the number of installed field devices, in order, on the one hand, to assure communication via the current loop and, on the other hand, to assure the operational capability of the field devices connected thereto. These supply devices provide a supply voltage, which serves, in each case, for operating the connected field device. For the field device, however, it is not discernible, from which voltage source the supply voltage is taken, or in which state the voltage source is. Therefore, the field device cannot be matched to the type of voltage source and/or its state, for example, to make life lengthening operational settings.

SUMMARY OF THE INVENTION

An object of the invention, therefore, is to enable a signaling of the state and/or type of the voltage supply.

According to the invention, the object is achieved by an electrical and/or electronic supply circuit, which serves to provide a first, or a second, essentially constant value of a supply voltage, which supply voltage serves to operate an operating electronics, wherein the supply circuit serves to output the first value of the supply voltage when the supply voltage is derived from a first voltage source, and wherein the supply circuit serves to output the second value of the supply voltage when the supply voltage is derived from a second voltage source.

On the basis of the value of the supply voltage, the operating electronics can draw conclusions concerning the state and/or type of the voltage supply, such as, for example, the type of voltage source, from which the supply voltage is derived. Thus, no separate signaling channel or other signaling apparatus or adjusting apparatus is necessary, in order to transfer corresponding information regarding the voltage source. Generally speaking, the supply voltage is set as a function of a state of the energy supply, or the available energy source; in given cases, the operating mode of the operating electronics, for example, a radio unit, can also be set in response to a certain value of the supply voltage.

In a form of embodiment of the supply circuit, the operating electronics has a first and a second operating mode, and the operating electronics assumes the first or second operating mode as a function, respectively, of the first value or second value of the supply voltage. The second operating mode can be an operating mode, which has, for example, a lower power or energy consumption compared to the first operating mode.

In an additional form of embodiment of the supply circuit, the first voltage source is a grid voltage, such as, for example, the grid voltage fed into an electrical current grid by a power company.

In an additional form of embodiment, the supply circuit includes an energy storer, especially a chargeable energy storer, which energy storer forms the second voltage source, wherein the energy storer serves to output the second value of the output voltage in the case of an interruption of the voltage supply from the first voltage source.

In an additional form of embodiment of the supply circuit, the first value of the supply voltage and the second value of the supply voltage are tappable via an output, especially a single output, of the supply circuit, wherein the first value of the supply voltage differs from the second value of the supply voltage. The first value and the second value of the supply voltage are, in such case, preferably tappable via a single output of the supply circuit.

In an additional form of embodiment of the supply circuit, the supply circuit serves to output a third value of the supply voltage, which differs from the first value and the second value of the supply voltage, when the energy storer is being charged via the first voltage source. Preferably, the first value, second value and third value of the supply voltage are likewise tappable via a single output of the supply circuit.

Furthermore, the object is achieved by a radio unit for a plant of process automation technology having a supply circuit according to at least one of the noted forms of embodiment, wherein the supply circuit includes a power supply for connecting to an electrical current grid and an energy storer, and the supply circuit, depending on whether the voltage supply occurs via the power supply or the energy storer, outputs the first value or second value of the supply voltage, wherein the first value and the second value differ from one another.

In a form of embodiment of the radio unit, the radio unit includes an operating electronics, which operating electronics serves to register the value of the supply voltage. The operating electronics can, in such case, serve primarily for the embodiment of the functions of the radio unit, i.e. for the embodiment of a wireless communication.

The radio unit can serve furthermore to supply a field device. For such purpose, a voltage for the supply of a field device connectable to the radio unit is provided via the operating electronics. Thus, the radio unit, including its operating electronics and a field device connectable to the radio unit, can be operated via the supply voltage.

In an additional form of embodiment of the radio unit, the operating electronics serves to set a first operating mode or a second operating mode of the operating electronics as a function of the value of the supply voltage. In the first operating mode, for example, both the operating electronics as well as, in given cases, the connected field device can be operated with electrical energy from the supply voltage, while in a second operating mode only the operating electronics is supplied and the supplying of the field device with electrical energy is interrupted.

In an additional form of embodiment of the radio unit, the operating electronics includes a communication interface, which serves to emit a corresponding radio signal when the supply voltage changes, especially when the supply voltage changes from the first value to the second value. The radio signal can include, for example, diagnostic information, for example, concerning the state of the voltage supply, and the time remaining for the radio unit to run with energy from the energy storer.

In an additional form of embodiment of the radio unit, the radio unit serves to supply at least one field device connectable to the radio unit. As already mentioned, such radio units, to which a field device is connectable and via which radio units the field device can be supplied with electrical energy, are known from the state of the art, such as described, for example, in Offenlegungsschrift DE 102004020393 A1. In such case, different connection configurations of the field device to the radio unit are possible, for example, via a universal interface, as described in DE 102008036967 A1.

The object is also achieved by a method for providing a supply voltage, by means of which supply voltage an operating electronics is operated, wherein a first essentially constant value of a supply voltage is output when the supply voltage is derived from a first voltage source, wherein a second essentially constant value of a supply voltage is output when the supply voltage is derived from a second voltage source.

The noted forms of embodiment relative to the supply circuit and the radio unit are analogously applicable to the proposed method.

BRIEF DESCRIPTION OF THE DRAWING

The invention will now be explained in greater detail based on the appended drawing, the sole figure of which shows as follows:

FIG. 1 is a schematic representation of the construction of a supply circuit according to a form of embodiment of the proposed invention.

DETAILED DISCUSSION IN CONJUNCTION WITH THE DRAWING

The supply circuit SC is connectable to a voltage source, not shown, via input terminals IT. Supply circuit SC is preferably integrated, in such case, in a radio unit RU, which is connectable to at least one field device. However, the supply circuit can also be integrated in other electrical and/or electronic devices, such as, for example, a field device, i.e. a sensor, actuator or other process-near component. The voltage source can be, for example, an alternating voltage source. The voltage source is, for example, a grid connection at 230V and 50 Hz. Furthermore a rectifier RE can be connected, for example, to the input terminals IT, in order to convert an, in given cases, applied, alternating voltage into a direct voltage.

Furthermore, supply circuit SC includes two outputs O1, O2, via which a first and a second supply voltage can be tapped. The first supply voltage serves, in such case, for operating the operating electronics OC and the second supply voltage serves for operating a separate field device connectable to the radio unit or for operating a bus system such as, for example, a HART bus system. Field devices and/or fieldbus systems are connectable, in such case, for example, via connection clamps to the radio unit and supply circuit SC.

It is, however, also possible to supply a field device, which is connectable to the radio unit, with electrical energy via the operating electronics, thus by means of the first supply voltage. For this purpose the operating electronics can have other outputs, not shown, to which a field device can be connected and supplied with electrical energy Via second output O2, for example, a second supply voltage of 24 V can be output, while, via the first output, a first or a second or a third value of the first supply voltage of, for example, 10 V, 11 V or 12 V can be output for operating electronics OC. The first supply voltage can thus assume different values. As a function of these different values, the operating electronics OC of the radio unit RU, for example, switches into different operating modes or sets off one or a number of radio signals.

A corresponding control unit CU can serve for charging the energy storer ES. Additionally, for signaling the different states, such as, for example, "energy storer ES is charging", "energy storer ES is discharging" or "energy storer ES is full" etc., a signaling system LED such as, for example, a light emitting diode, can be used; signaling system LED is, for example, likewise connected to control unit CU.

In error free operation, the switch S is in the position 1, so that the first supply voltage of, for example, 12 V output by the transformer TR is directly fed to the first output O1. In the case of an interruption of the supplying by the voltage source via the terminals IT, the energy storer ES discharges and provides a voltage of, for example, 10 V. Since, for example, only limited power is available in a hazardous area, a rapid (re-)charging of energy storer ES and simultaneously supplying, in given cases, a field device connected to the radio unit is not possible. Thus, if the energy storer ES is charging, switch S switches to position 2. Then, the energy storer ES is charged and, however, for example, only 11 V is provided via first output O1. To this end, a voltage converter VC can be provided.

The supply circuit SC, according to the example of an embodiment in FIG. 1, furthermore includes a galvanic isolation GI between input, primary current circuit C1 and output, secondary current circuit C2. For this purpose, supply circuit SC includes a transformer TR and an optocoupler OPT.

Energy storer ES of the supply circuit can be designed so that at least the radio network, i.e. the radio connection via the radio unit, is uninterrupted for a predetermined period of time, for example, about 30 minutes in the case of an interruption of the grid voltage. In this period of time, maintenance information or emergency signals can be transmitted.

Additionally, in the case in which the supply voltage is delivered from the energy storer, the field device connected to the radio unit must, in given cases, be switched off, in order to save energy. For this purpose, the supply circuit can thus output corresponding information in the form of the provided value of the supply voltage.

In such case, for example, the states "supply is in order (according to specification)", "supply is in order and energy storer is being charged" and "supply is interrupted, energy storer being substituted" can be signaled by means of different values of the supply voltage, for example, 10 V, 11 V, and 12 V, respectively. These values of the supply voltage can be measured, for example, by means of a detection circuit in the operating electronics. Based on the value of the supply voltage determined in such a manner, different operating modes of the operating electronics can then be set. For example, a connected field device can, in given cases, be switched off, or a warning or an all clear can be sent via the communication interface of the radio unit.

The invention claimed is:

1. An arrangement comprising:
an electrical and/or electronic supply circuit that provides a supply voltage, which serves to output a first value of the supply voltage when the supply voltage is derived from a first voltage source and a second value of the supply voltage when the supply voltage is derived from a second voltage source, wherein said second voltage source is a chargeable energy storer and
an operating electronics for a radio unit for a plant of process automation technology which serves for the functions of the radio unit and provides a voltage for the supply of a field device which is connectable to said radio unit; and
a detection circuit in said operating electronics which measures the values of the supply voltage and sets said operating electronics to different operating modes based on the measured value; wherein, in the case in which the supply voltage is delivered from the second voltage source a radio connection via the radio unit is uninterrupted for a predetermined period of time and wherein said field device connected to the radio unit is switched off to save energy.

2. The arrangement as claimed in claim 1, wherein:
the operating electronics has a first and a second mode; and
said operating electronics sets said first or second operating mode as a function of the first or the second value of the supply voltage.

3. The arrangement as claimed in claim 1, wherein:
the supply circuit serves to output a third value of the supply voltage, which differs from the first value and the second value of the supply voltage, when said energy storer is being charged via said first voltage source.

4. A radio unit for a plant of process automation technology comprising an arrangement as claimed in claim 1, wherein:
the supply circuit Includes a power supply and an energy storer, and the supply circuit outputs the first value or second value of the supply voltage as a function of whether the voltage supply occurs via the power supply or the energy storer,
wherein the radio unit includes said operating electronics, which measures the values of the supply voltage and sets said operating electronics to different operating modes based on the measured value, wherein:
in the case in which the supply voltage is delivered from the energy storer a radio connection via the radio unit is uninterrupted for a predetermined period of time; and
said field device connected to the radio unit is switched off.

5. The radio unit as claimed in claim 4, wherein:
said operating electronics serves to set a first or second operating mode of said operating electronics as a function of the value of the supply voltage.

6. The radio unit as claimed in claim 4 wherein:
said operating electronics has a communication interface and in the case, in which the supply voltage changes, from the first value to the second value, said communication interface serves to transmit a corresponding radio signal.

7. The arrangement as claimed in claim 1, wherein said first voltage source is an alternating voltage source.

8. The arrangement as claimed in claim 1, wherein said first voltage source is a grid connection.

9. The arrangement as claimed in claim 1, wherein said second voltage source is an chargeable energy storer.

10. The arrangement as claimed in claim 1, wherein said first value of the supply voltage differs from said second value of the supply voltage.

11. A method for providing a supply voltage, by means of which supply voltage an operating electronics of a radio unit for a plant of process automation technology is operated, said radio unit provides a voltage for the supply of a field device which is connected to the radio unit, comprising the steps of:
a first value of a supply voltage is output when the supply voltage is derived from a first voltage source;
a second value of a supply voltage is output when the supply voltage is derived from a second voltage source; and
measuring the values of the supply voltage and sets said operating electronics to different operating modes based on the measured value, wherein:
in the case in which the supply voltage is delivered from the second voltage source a radio connection via said radio unit is uninterrupted for a predetermined period of time; and
said field device connected to the radio unit is switched off.

* * * * *